United States Patent
Bak

(10) Patent No.: US 11,817,013 B2
(45) Date of Patent: *Nov. 14, 2023

(54) DISPLAY APPARATUS AND METHOD FOR QUESTION AND ANSWER

(71) Applicant: Samsung Electronics Co., Ltd., Suwon-si (KR)

(72) Inventor: Eun-sang Bak, Ansan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 373 days.

This patent is subject to a terminal disclaimer.

(21) Appl. No.: 17/097,142

(22) Filed: Nov. 13, 2020

(65) Prior Publication Data
US 2021/0065572 A1 Mar. 4, 2021

Related U.S. Application Data

(63) Continuation of application No. 16/420,788, filed on May 23, 2019, now Pat. No. 10,922,990, which is a
(Continued)

(30) Foreign Application Priority Data

Nov. 12, 2014 (KR) .......................... 10-2014-0156901

(51) Int. Cl.
*G10L 15/00* (2013.01)
*G09B 7/00* (2006.01)
(Continued)

(52) U.S. Cl.
CPC ............... *G09B 7/00* (2013.01); *G06F 3/167* (2013.01); *G06F 16/243* (2019.01);
(Continued)

(58) Field of Classification Search
CPC ...... G06F 40/295; G06F 40/279; G06F 40/20; G06F 40/205; G06F 40/237;
(Continued)

(56) References Cited

U.S. PATENT DOCUMENTS 6,324,512 B1 * 11/2001 Junqua ............. H04N 21/42203
704/256.1
6,721,706 B1 4/2004 Strubbe et al.
(Continued)

FOREIGN PATENT DOCUMENTS

CN 101313276 11/2008
CN 102203774 9/2011
(Continued)

OTHER PUBLICATIONS

P. Rosso, L.-F. Hurtado, E. Segarra and E. Sanchis, "On the Voice-Activated Question Answering," in IEEE Transactions on Systems, Man, and Cybernetics, Part C (Applications and Reviews), vol. 42, No. 1, pp. 75-85, Jan. 2012. (Year: 2012).*

(Continued)

*Primary Examiner* — Edgar X Guerra-Erazo
(74) *Attorney, Agent, or Firm* — STAAS & HALSEY LLP

(57) ABSTRACT

A display apparatus and a method for questions and answers includes a display unit includes an input unit configured to receive user's speech voice; a communication unit configured to perform data communication with an answer server; and a processor configured to create and display one or more question sentences using the speech voice in response to the speech voice being a word speech, create a question language corresponding to the question sentence selected from among the displayed one or more question sentences, transmit the created question language to the answer server via the communication unit, and, in response to one or more (Continued)

answer results related to the question language being received from the answer server, display the received one or more answer results. Accordingly, the display apparatus may provide an answer result appropriate to a user's question intention although a non-sentence speech is input.

20 Claims, 8 Drawing Sheets

Related U.S. Application Data continuation of application No. 14/919,856, filed on Oct. 22, 2015, now Pat. No. 10,339,823.

(51) Int. Cl.

| | | |
|---|---|---|
| G10L 15/18 | (2013.01) | |
| G06F 3/16 | (2006.01) | |
| G10L 15/30 | (2013.01) | |
| G06F 16/242 | (2019.01) | |
| G06F 16/332 | (2019.01) | |
| G06F 16/432 | (2019.01) | |
| G06F 40/295 | (2020.01) | |

(52) U.S. Cl.
CPC ...... *G06F 16/3322* (2019.01); *G06F 16/3329* (2019.01); *G06F 16/433* (2019.01); *G06F 40/295* (2020.01); *G10L 15/1822* (2013.01); *G10L 15/30* (2013.01)

(58) Field of Classification Search
CPC .... G06F 40/242; G06F 40/253; G06F 40/268; G06F 40/289; G06F 40/284; G06F 40/35; G06F 40/30; G10L 15/18; G10L 15/00; G10L 15/02; G10L 2015/022; G10L 2015/025; G10L 2015/027; G10L 15/04; G10L 15/05; G10L 2015/086; G10L 2015/088; G10L 15/1815; G10L 15/1822; G10L 15/183; G10L 15/187; G10L 15/19; G10L 15/197; G10L 15/193; G10L 15/20; G10L 15/22; G10L 2015/221; G10L 15/222; G10L 2015/223; G10L 2015/225; G10L 15/26; G10L 15/30; G10L 15/285; G10L 15/32; G10L 15/34; G10L 17/00; G10L 17/24; G10L 17/22; G10L 17/26
See application file for complete search history.

(56) References Cited

U.S. PATENT DOCUMENTS

| | | | |
|---|---|---|---|
| 7,216,077 | B1 | 5/2007 | Padmanabhan |
| 7,461,047 | B2 | 12/2008 | Masuichi |
| 7,873,519 | B2 | 1/2011 | Bennett |
| 8,155,959 | B2 | 4/2012 | Weng |
| 8,200,485 | B1 | 6/2012 | Lee |
| 8,355,914 | B2 | 1/2013 | Joh |
| 8,670,979 | B2 | 3/2014 | Gruber et al. |
| 9,147,395 | B2 | 9/2015 | Kim et al. |
| 9,514,742 | B2 | 12/2016 | Lee et al. |
| 9,582,245 | B2 | 2/2017 | Kim et al. |
| 9,858,925 | B2 | 1/2018 | Gruber et al. |
| 10,120,645 | B2 | 11/2018 | Kim et al. |
| 10,339,823 | B2 | 7/2019 | Bak |
| 10,922,990 | B2 * | 2/2021 | Bak ..................... G06F 16/3329 |
| 11,086,596 | B2 | 8/2021 | Kim et al. |
| 2001/0041980 | A1 * | 11/2001 | Howard ............. H04N 21/4394 704/E15.045 |
| 2002/0046023 | A1 | 4/2002 | Fujii et al. |
| 2002/0052742 | A1 | 5/2002 | Thrasher |
| 2002/0091520 | A1 | 7/2002 | Endo |
| 2003/0076240 | A1 | 4/2003 | Bae |
| 2003/0104839 | A1 | 6/2003 | Kraft |
| 2005/0203751 | A1 | 9/2005 | Stevens |
| 2006/0041926 | A1 | 2/2006 | Istvan |
| 2006/0190436 | A1 | 8/2006 | Richardson et al. |
| 2006/0293890 | A1 | 12/2006 | Blair |
| 2007/0033037 | A1 | 2/2007 | Mowatt |
| 2007/0100635 | A1 | 5/2007 | Mahajan et al. |
| 2007/0150275 | A1 | 6/2007 | Garner |
| 2009/0326938 | A1 | 12/2009 | Marila |
| 2010/0049513 | A1 | 2/2010 | Huang et al. |
| 2010/0088100 | A1 | 4/2010 | Lindahl |
| 2010/0114574 | A1 | 5/2010 | Liu et al. |
| 2011/0184740 | A1 | 7/2011 | Gruenstein et al. |
| 2012/0265528 | A1 | 10/2012 | Gruber et al. |
| 2012/0316876 | A1 | 12/2012 | Jang et al. |
| 2013/0117022 | A1 | 5/2013 | Chen |
| 2013/0179173 | A1 | 7/2013 | Lee et al. |
| 2014/0006022 | A1 | 1/2014 | Yoon et al. |
| 2014/0006027 | A1 | 1/2014 | Kim et al. |
| 2014/0092007 | A1 | 4/2014 | Kim et al. |
| 2014/0095174 | A1 | 4/2014 | Kim et al. |
| 2014/0095176 | A1 | 4/2014 | Kim et al. |
| 2014/0163978 | A1 | 6/2014 | Basye |
| 2014/0188463 | A1 | 7/2014 | Noh |
| 2014/0195244 | A1 | 7/2014 | Cha et al. |
| 2014/0250463 | A1 * | 9/2014 | Barton ................. H04N 21/812 725/42 |
| 2014/0297284 | A1 | 10/2014 | Gruber et al. |
| 2015/0058014 | A1 | 2/2015 | Lee et al. |
| 2015/0127353 | A1 | 5/2015 | Cho et al. |
| 2015/0161204 | A1 | 6/2015 | Kim |
| 2016/0241918 | A1 * | 8/2016 | Barton ............... H04N 21/4882 |
| 2019/0026075 | A1 | 1/2019 | Kim et al. |

FOREIGN PATENT DOCUMENTS

| | | |
|---|---|---|
| CN | 103226949 | 7/2013 |
| EP | 1 494 129 A1 | 1/2005 |
| EP | 1494129 | 1/2005 |
| EP | 2 453 368 A1 | 5/2012 |
| JP | 11-202887 A | 7/1999 |
| JP | 2014-132465 A | 7/2014 |
| KR | 10-2012-0135855 A | 12/2012 |
| KR | 10-2013-0086971 A | 8/2013 |
| KR | 10-2013-0103205 A | 9/2013 |
| KR | 10-1309794 B1 | 9/2013 |
| KR | 10-2013-0125067 A | 11/2013 |
| KR | 10-1330671 B1 | 11/2013 |
| KR | 10-2014-0001711 A | 1/2014 |
| KR | 10-2014-0111538 A | 9/2014 |
| WO | 2007/053294 | 5/2007 |
| WO | 2010/062737 | 6/2010 |
| WO | WO 2013/172534 A1 | 11/2013 |

OTHER PUBLICATIONS

Office Action dated Jun. 16, 2022, issued in Korean Application No. 10-2021-0074915.
Junlan Feng et al., "Speech and Multimodal Interaction in Mobile Search", IEEE Signal Processing Magazine, Jul. 2011, pp. 40-49.
Extended European Search Report dated Jan. 25, 2016 in European Patent Application No. 15193835.4.
European Office Communication dated Jul. 27, 2017 in European Patent Application No. 15193835.4.
U.S. Office Action dated Jan. 12, 2018 in U.S. Appl. No. 14/919,856.
U.S. Office Action dated Jul. 23, 2018 in U.S. Appl. No. 14/919,856.
U.S. Office Action dated Oct. 19, 2018 in U.S. Appl. No. 14/919,856.
U.S. Notice of Allowance dated Feb. 21, 2019 in U.S. Appl. No. 14/919,856.
U.S. Appl. No. 10/475,446 B2, filed Nov. 12, 2019, Gruber et al. (corresponds to BH).
Chinese Office Action dated Sep. 4, 2019 in Chinese Patent Application No. 201510765555.X.
Chinese Office Action dated Oct. 29, 2020 in Chinese Patent Application No. 201510765555.X.
U.S. Office Action dated Feb. 7, 2020 in U.S. Appl. No. 16/420,788.

(56) References Cited

OTHER PUBLICATIONS

U.S. Notice of Allowance dated Aug. 10, 2020 in U.S. Appl. No. 16/420,788.
U.S. Notice of Allowance dated Nov. 16, 2020 in U.S. Appl. No. 16/420,788.
U.S. Appl. No. 16/420,788, filed May 23, 2019, Eun-sang Bak, Samsung Electronics Co., Ltd.
U.S. Appl. No. 14/919,856 (now U.S. Pat. No. 10,339,823), filed Oct. 22, 2015, Eun-sang Bak, Samsung Electronics Co., Ltd.
Korean Office Action dated Nov. 16, 2020 in Korean Patent Application No. 10-2014-0156901.
Chinese Office Action dated Mar. 3, 2021, in corresponding Chinese Patent Application No. 201510765555.X.
Korean Office Action dated Mar. 31, 2021, in corresponding Korean Patent Application No. 10-2014-0156901.
Korean Office Action dated May 17, 2021, in corresponding Korean Patent Application No. 10-2014-0156901.

\* cited by examiner

FIG. 4

| | | |
|---|---|---|
| 410 | WHAT IS A TITLE OF A MOVIE AAA APPEARS IN? | AAA, MOVIE, TITLE |
| 420 | HOW MANY MOVIE AAA HAS APPEARED IN? | AAA, MOVIE, NUMBER |
| 430 | WHICH ACTRESS DOES APPEAR IN THE MOVIE TOGETHER WITH AAA? | AAA, MOVIE, CAST, ACTRESS |
| 440 | WHAT MOVIE HAS AAA RECENTLY APPEARED IN? | AAA, MOVIE, RECENT |
| 450 | WHAT IS A FIRST MOVIE AAA APPEARED IN? | AAA, MOVIE, RELEASE YEAR AND MONTH |
| 460 | WHAT IS A TITLE OF A MOVIE AAB APPEARS IN? | AAB, MOVIE, TITLE |

DISPLAY APPARATUS AND METHOD FOR QUESTION AND ANSWER

CROSS-REFERENCE TO RELATED APPLICATIONS

This application is a continuation application of U.S. patent application Ser. No. 16/420,788, filed on May 23, 2019, which is a continuation application of U.S. patent application Ser. No. 14/919,856, filed on Oct. 22, 2015, which claims priority from Korean Patent Application No. 10-2014-0156901, filed on Nov. 12, 2014, in the Korean Intellectual Property Office, the disclosures of which are incorporated herein by reference in their entirety.

BACKGROUND

1. Field

The following description relates to a display apparatus and method for questions and answers, and more particularly, to a display apparatus and method that provide a question and answer service related to non-sentence speech.

2. Description of the Related Art

Because display apparatuses have been capable of recognizing user's voice, display apparatuses have been capable of recognizing user's speech voice to provide a voice recognition result intended by users or perform a control command.

In particular, the most universal method related to a voice conversation service that provides the voice recognition result intended by users is a keyword recognition method that performs a conversation between users and display apparatuses through a search engine. Such a keyword recognition method refers to display apparatuses that perform a search related to a core keyword based on speech voice related to the core keyword and provide a search result. However, such a method provides numerous search results related to the speech voice for the core keyword, and thus users experience inconvenience by having to search for desired information from numerous search results.

Another method is a sentence recognition method, where display apparatuses analyze speech voice related to a question sentence of a user to determine a user's speech intention, perform a search based on the determined speech intention, and provide an answer result according to the search.

Such a sentence recognition method is advantageous compared to the keyword recognition method described above in that the sentence recognition method provides an answer result closer to the user's speech intention. However, when a sentence speech appropriate to a preset pattern is not input, or noise occurs in the sentence speech due to an external environment, such a sentence recognition method does not perform correct voice recognition on the sentence speech of a user.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides a display apparatus that clearly determines a user's question intention from the user's non-sentence speech voice and provides an answer result according to the determination.

According to an aspect of the present disclosure, a display apparatus including a display unit includes an input unit configured to receive user's speech voice; a communication unit configured to perform data communication with an answer server; and a processor configured to create and display one or more question sentences using the speech voice if the speech voice is a word speech, create a question language corresponding to the question sentence selected from among the displayed one or more question sentences, transmit the question language to the answer server via the communication unit, and, if one or more answer results related to the question language are received from the answer server, display the received one or more answer results.

The display apparatus may further include: a storage unit configured to store a plurality of sentences and keywords corresponding to characteristic vectors for the plurality of respective sentences, wherein the processor compares similarity in a pronunciation column between the keywords corresponding to the characteristic vectors of the plurality of respective sentences previously stored in the storage unit and the spoken word, determines a sentence including a keyword having a high similarity with the spoken word as the question sentence related to the speech voice, and displays the determined sentence.

If a plurality of sentences are determined as the question sentences, the processor may display the plurality of sentences selected as the question sentences in order of high number of times previously selected as the question sentences based on selection history information of each of the plurality of sentences.

If a plurality of sentences are determined as the question sentences, the processor may select and display sentences corresponding to a preset number from a sentence having highest number of times previously selected as the question sentences from among the plurality of sentences selected as the question sentences based on selection history information of each of the plurality of sentences.

If keywords related to the spoken word (or utterance word) are received from the answer server, the processor may combine the received keywords, create the question sentence with respect to the speech voice, and display the question sentence.

The answer server may be a triple structure knowledge base server and extract keywords associated with the spoken word using attribute information related to the spoken word.

When there is no sentence including the keyword having the high similarity with the spoken word, the processor may receive the spoken word and the keywords from the answer server, combine the received keywords, and create a question sentence related to the speech voice.

If the user's speech voice is a sentence speech, the processor may extract an object name from the user's speech voice using natural language processing based algorithm and creates a question language based on the extracted object name.

According to an aspect of the present disclosure, a method, performed by a display apparatus, of providing questions and answers includes receiving user's speech voice; if the user's speech voice is a word speech, creating and displaying one or more question sentences using the user's speech voice; creating a question language corresponding to the question sentence selected from among the displayed one or more question sentences and transmitting the question language to an answer server; and receiving and displaying one or more answer results related to the question language from the answer server.

The creating and displaying of the one or more question sentences may include: comparing similarity in a pronunciation column between the keywords corresponding to the characteristic vectors each of a plurality of previously stored sentences and the spoken word, determining a sentence including a keyword having a high similarity with the spoken word as the question sentence, and displaying the determined sentence.

The creating and displaying of the one or more question sentences may include: if a plurality of sentences are determined as the question sentences, displaying the plurality of sentences selected as the question sentences in order of high number of times previously selected as the question sentences based on selection history information of each of the plurality of sentences.

The creating and displaying of the one or more question sentences may include: if a plurality of sentences are determined as the question sentences, selecting and displaying sentences corresponding to a preset number from a sentence having highest number of times previously selected as the question sentences from among the plurality of sentences selected as the question sentences based on selection history information of each of the plurality of sentences.

The creating and displaying of the one or more question sentences may include: if keywords related to the spoken word are received from the answer server, combining the received keywords, creating the question sentence with respect to the speech voice, and displaying the created question sentence.

The answer server may be a triple structure knowledge base server and extract keywords associated with the core vocabulary (or core word) using attribute information related to the core vocabulary.

The creating and displaying of the one or more question sentences may include: when there is no sentence including the keyword having the high similarity with the spoken word, receiving the keywords associated with the spoken word from the answer server, combining the received keywords, and creating and displaying a question sentence related to the speech voice.

The method may further include determining whether the user's speech voice is a word speech or a sentence speech, wherein the transmitting includes, if the user's speech voice is a sentence speech, extracting an object name from the user's speech voice using natural language processing based algorithm, creating a question language based on the extracted object name, and transmitting the created question language to the answer server.

According to an aspect of the present disclosure, a non-transitory computer-readable storage medium coupled to a display apparatus that provides questions and answers and storing a computer program for executing the following operations of: receiving user's speech voice; if the user's speech voice is a word speech, creating and displaying one or more question sentences using the user's speech voice; creating a question language corresponding to the question sentence selected from among the displayed one or more question sentences and transmitting the question language to an answer server; and receiving and displaying one or more answer results related to the question language from the answer server.

Additional and/or other aspects and advantages of the disclosure will be set forth in part in the description which follows and, in part, will be obvious from the description, or may be learned by practice of the disclosure.

BRIEF DESCRIPTION OF THE DRAWINGS

The above and/or other aspects of the present disclosure will be more apparent by describing certain exemplary embodiments of the present disclosure with reference to the accompanying drawings, in which:

FIG. 4 is an example diagram of describing a display apparatus that creates a question sentence according to an exemplary embodiment of the present disclosure;

DETAILED DESCRIPTION

Figure 1:
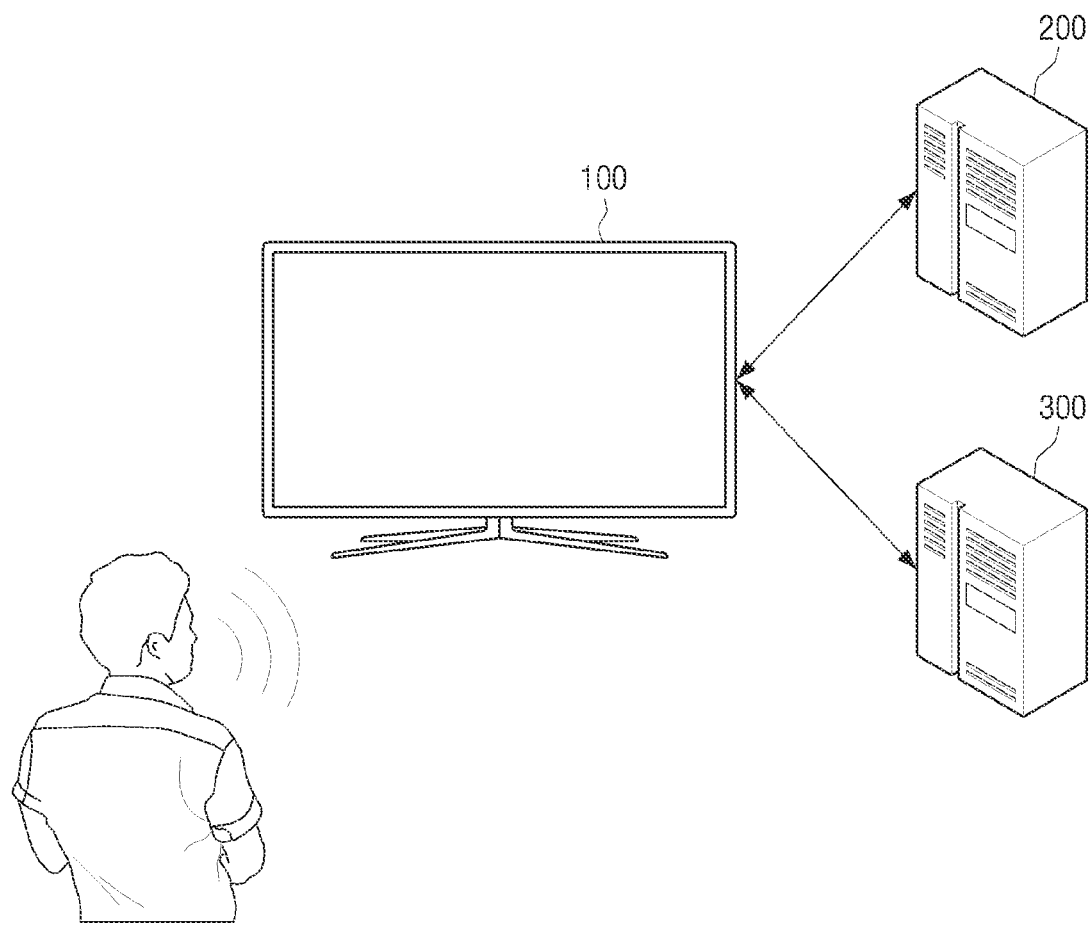
FIG. 1 is a block diagram of a conversation type system according to an exemplary embodiment of the present disclosure.

Reference will now be made in detail to the embodiments, examples of which are illustrated in the accompanying drawings, wherein like reference numerals refer to like elements throughout. The embodiments are described below to explain the present disclosure by referring to the figures.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail because they would obscure the disclosure with unnecessary detail.

The terms "first", "second", etc. may be used to describe diverse components, but the components are not limited by the terms. The terms are only used to distinguish one component from the others.

The terms used in the present disclosure are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, the present disclosure will be described in detail with reference to the accompanying drawings.

In the following description, same drawing reference numerals are used for the same elements even in different drawings. The matters defined in the description, such as detailed construction and elements, are provided to assist in a comprehensive understanding of the disclosure. Thus, it is apparent that the exemplary embodiments of the present disclosure can be carried out without those specifically defined matters. Also, well-known functions or constructions are not described in detail because they would obscure the disclosure with unnecessary detail.

FIG. 1 is a block diagram of a conversation type system according to an exemplary embodiment of the present disclosure.

As illustrated in FIG. 1, the conversation type system includes a display apparatus 100, a voice recognition apparatus 200, and an answer server 300.

The display apparatus 100 is an apparatus that recognizes user's speech voice to perform an operation intended by a user and may be implemented as various electronic apparatuses such as a smart TV, a smart phone, a tablet PC, etc.

The voice recognition apparatus 200 converts a voice signal of the user's speech voice received from the display apparatus 100 into text and transmits a voice recognition result converted into text to the display apparatus 100. However, the present disclosure is not limited thereto. When data communication between the display apparatus 100 and the voice recognition apparatus 200 is not performed or the speech voice is input via a microphone (not shown), the display apparatus 100 may convert the voice signal of the input user's speech voice into text.

The answer server 300 is a triple structure knowledge base server and provides keywords associated with a word spoken by a user when the text converted from the user's speech voice includes the word. The answer server 300 provides answer information related to a question language received from the display apparatus 100.

In more detail, while the display apparatus 100 operates in a voice recognition mode, the user may perform a question related speech regarding desired information in order to receive the desired information through the display apparatus 100. According to an exemplary embodiment, if the user's speech voice is input via the microphone (not shown), the display apparatus 100 may internally perform voice recognition on the user's speech voice and convert the input user's speech voice into text. If the user's speech voice is input via a remote control apparatus (not shown) such as a remote controller, the display apparatus 100 transmits the voice signal of the user's speech voice to the voice recognition apparatus 200. Accordingly, the voice recognition apparatus 200 converts the voice signal of the speech voice received from the display apparatus 100 into text and transmits the voice recognition result according to the converted text.

If the user's speech voice is converted into text through such a process, the display apparatus 100 analyzes text converted from the user's speech voice and determines whether the speech voice is a sentence speech or is a speech including one or more words.

As a result of determination, if the user's speech voice is the speech including one or more words, the display apparatus 100 displays one or more question sentences related to the one or more words. In this regard, the one or more question sentences are sentences predicted as a user's question intention and may be obtained or created through the following exemplary embodiments.

According to an exemplary embodiment, the display apparatus 100 may determine sentences including keywords related to one or more words spoken by the user among a plurality of previously stored sentences as question sentences. According to an exemplary embodiment, the display apparatus 100 may receive keywords associated with a word spoken by the user from the answer server 300, combine the received keywords, and create question sentences related to the speech voice. Operations of determining and creating a question sentence through the exemplary embodiments will be described in detail below.

Thereafter, the display apparatus 100 may display the one or more question sentences predicted as the user's question intention from the user's speech voice. Accordingly, the user may select a question sentence that matches the user's question intention from among the one or more question sentences displayed on the display apparatus 100.

Meanwhile, if the user selects the question sentence or the user's speech voice is the sentence speech, the display apparatus 100 may determine a sentence structure using a natural language processing based algorithm and extract an object name present in the sentence. Thereafter, the display apparatus 100 may create a question language based on the extracted object name. In this regard, the question language is a language recognizable by the answer server 300. According to exemplary embodiments, the question language may be a SPARQL protocol and RDF query language (SPARQL) based language. The SPARQL based language may be a language for questioning a document of a semantic web ontology language (RDF (Resource Description Framework), RDFs (Resource Description Framework Schema), OWL (ONTOLOO Web Language)) provided in the W3C (World Wide Web Consortium) standard.

If such a SPARQL based question language is created, the display apparatus 100 transmits the created question language to the answer server 300. The answer server 300 that has received the question language from the display apparatus 100 may obtain one or more answer results based on the received question language and transmit the answer results to the display apparatus 100. Accordingly, the display apparatus 100 may receive the one or more answer results transmitted from the answer server 300 and display the one or more answer results on a screen, and thus the user may be provided with the answer result that is most appropriate to the user's question intention through the one or more answer results displayed on the screen of the display apparatus 100.

The operations in which the conversation type system according to the exemplary embodiment provides a question and answer service appropriate to a user's question intention have been described in detail above. Operations in which the display apparatus 100 according to the exemplary embodiment provides a question and answer service appropriate to a user's question intention will be described in detail below.

Figure 2:
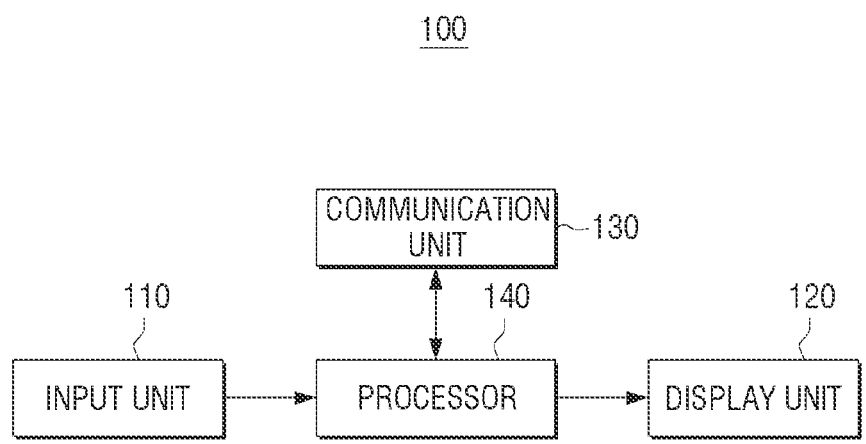
FIG. 2 is a schematic block diagram of a display apparatus according to an exemplary embodiment of the present disclosure.
Figure 3:
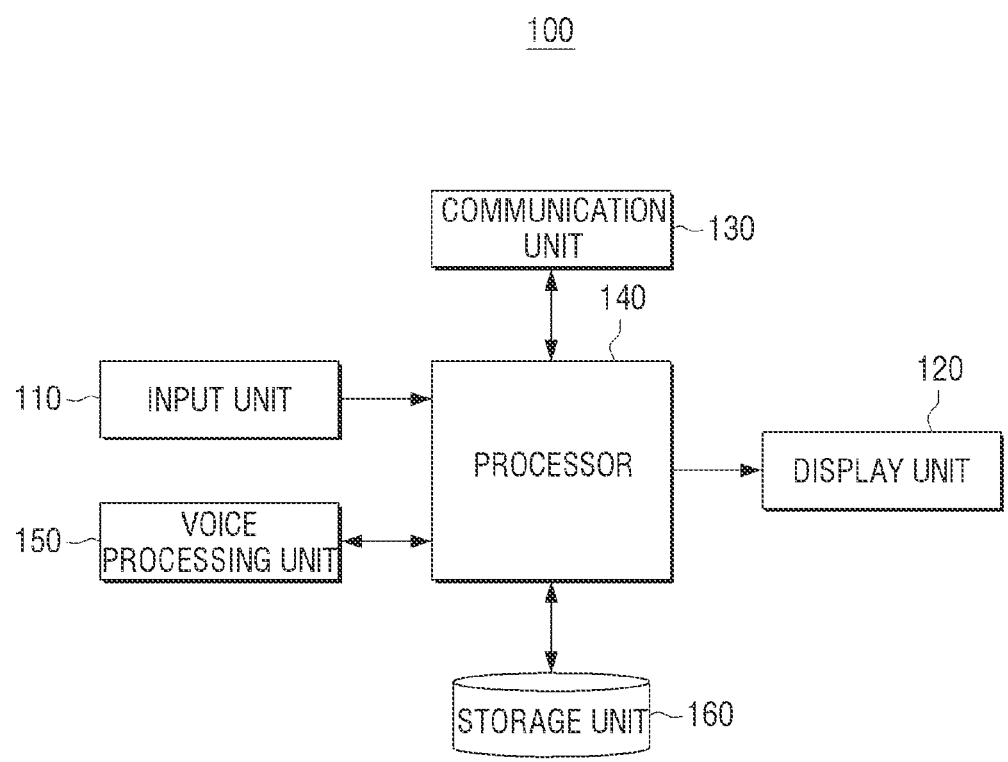
FIG. 3 is a detailed block diagram of a display apparatus according to an exemplary embodiment of the present disclosure.

FIG. 2 is a schematic block diagram of the display apparatus 100 according to an exemplary embodiment of the present disclosure. FIG. 3 is a detailed block diagram of the display apparatus 100 according to an exemplary embodiment of the present disclosure.

As shown in FIG. 2, the display apparatus 100 may include an input unit 110, a display unit 120, a communication unit 130, and a processor 140. In addition, the display apparatus 100 may further include a voice processing unit 150 and a storage unit 160 as shown in FIG. 3.

The input unit 110 is for receiving and transferring various user manipulations to the processor 140 and may be implemented as an input panel. In this regard, the input panel may include a touch pad, a key pad including various function keys, number keys, special keys, character keys, etc. or a touch screen. In particular, the input unit 110 may receive a user's speech voice via a microphone (not shown).

The display unit 120 may display question sentences related to the user's speech voice and answer results of the user's speech voice. The display unit 120 may be implemented as a liquid crystal display (LCD), an organic light emitting display (OLED), or a plasma display panel (PDP), etc. In addition, the display unit 120 may be implemented as a touch panel and receive a user touch instruction.

The communication unit 130 may perform data communication with the answer server 300 and receive an answer result related to the user's speech voice. The communication unit 130 may perform data communication with a remote control apparatus (not shown) such as a remote controller and receive a voice signal of the user's speech voice. The communication unit 130 may include various communication modules such as a near distance wireless communication module (not shown), a wireless communication module (not shown), etc.

In this regard, the near distance wireless communication module (not shown) is a communication module that performs wireless communication with a conversation type server 200 located at a near distance and an external server (not shown) providing content, and may be, for example, Bluetooth, Zigbee, etc. The wireless communication module (not shown) is a module connected to an external network according to a wireless communication protocol such as WiFi, IEEE, etc. and performing communication. In addition, the wireless communication module may further include a mobile communication module that accesses a mobile communication network and performs communication according to various mobile communication standards such as $3^{rd}$ generation (3G), $3^{rd}$ generation partnership project (3GPP), long term evolution (LTE), etc.

The processor 140 is for controlling an apparatus, may be used with a central processing unit, a microprocessor, a controller, etc., and is used to control general operations of the apparatus. The processor 140 may be coupled to a different function part such as the voice processing unit 150, the communication unit 130, etc. and implemented as a system-on-a-chip (SOC) or a system on chip (SoC).

If the speech voice is word text, the processor 140 may control the display unit 120 to display one or more question sentences related to one or more words. Thereafter, the processor 140 may control the communication unit 130 to analyze a question sentence selected by a user from among the displayed one or more question sentences, create a question language corresponding to the question sentence, and transmit the generated question language to the answer server 300. Thereafter, if one or more answer results related to the question language are received from the answer server 300, the display unit 120 may display the one or more answer results received from the answer server 300 according to a control instruction of the processor 140.

In more detail, the processor 140 may obtain text of the user's speech voice based on the following exemplary embodiments.

According to an exemplary embodiment, the processor 140 may determine a subject that is to perform voice recognition on the user's speech voice according to whether speech voice related to the user's speech voice is input in the input unit 110 via the microphone (not shown) or the remote control apparatus (not shown).

If the user's speech voice is input in the input unit 110, the processor 140 may control the voice processing unit 150 to perform voice recognition on the user's speech voice. According to such a control instruction, the voice processing unit 150 may convert the user's speech voice into text using a speech to text (STT) algorithm.

Meanwhile, if the voice signal of the user's speech voice is received through the communication unit 130, the processor 140 may transmit the voice signal of the user's speech voice to the voice recognition apparatus 200. Accordingly, the voice recognition apparatus 200 may perform voice recognition on the received voice signal of the user's speech voice, convert the voice signal of the user's speech voice into text, and transmit a voice recognition result to the display apparatus 100.

According to an exemplary embodiment, the processor 140 may determine the subject that is to perform voice recognition on the user's speech voice according to whether to be able to perform data communication with the voice recognition apparatus 200 through the communication unit 130. If the processor 140 is able to perform data communication with the voice recognition apparatus 200, the processor 140 may receive the voice recognition result regarding the user's speech voice from the voice recognition apparatus 200. If the processor 140 is unable to perform data communication with the voice recognition apparatus 200, the processor 140 may perform voice recognition on the user's speech voice through the voice processing unit 150.

If text of the user's speech voice is created through the above exemplary embodiment, the processor 140 may analyze the text created from the user's speech voice and determine whether a user speech is a sentence speech or a word speech. According to an exemplary embodiment, the processor 140 may analyze a sentence structure of the text of the speech voice through a morpheme analysis and a syntax analysis that are natural language processing technologies and determine whether the user speech is the sentence speech or the word speech. Such a natural language processing technology is well known, and thus a detailed description thereof is omitted in the present disclosure.

If the user speech is the speech including one or more words through a text analysis of the speech voice, the processor 140 may determine a question sentence predicted as a user's intention and display the determined question sentence on the display unit 120 according to the following exemplary embodiments.

According to an exemplary embodiment, the processor 140 may determine one or more sentences including keywords related to one or more words spoken by the user among a plurality of previously stored sentences as the question sentences related to the user's speech voice. In more detail, the storage unit 160 may store the plurality of sentences and keywords corresponding to characteristic vectors for the plurality of respective sentences. Thus, the processor 140 may compare similarity in a pronunciation column between the keywords corresponding to the characteristic vectors of the plurality of sentences previously stored in the storage unit 160 and the one or more words. Thereafter, the processor 140 may determine a sentence including a keyword having a high similarity with the one or more words spoken by the user as the question sentence related to the speech voice.

According to an exemplary embodiment, the processor 140 may transmit the one or more words spoken by the user to the answer server 300, if receiving keywords associated with the one or more words from the answer server 300, combine the received keywords, and create the question sentence with respect to the user's speech voice. In this regard, the answer server 300 is a triple structure knowledge base server and may perform an operation of extracting keywords associated with a word spoken by the user using attribute information related to the word and transmitting the extracted keywords to the display apparatus 100.

According to an exemplary embodiment, when there is no sentence including the keywords related to the one or more words spoken by the user among the plurality of previously stored sentences, the processor 140 may transmit the one or more words to the answer server 300. Thus, the answer server 300 may perform an operation of extracting keywords associated with the one or more words received from the display apparatus 100 using attribute information related to the one or more words and transmitting the keywords to the display apparatus 100.

As described above, if the question language related to the question sentence is received, the answer server 300 providing the keywords related to the one or more words received from the display apparatus 100 may perform an operation of transmitting an answer result of the question sentence based on the received question language to the display apparatus 100. In this regard, the question language may be a SPARQL protocol and RDF query language (SPARQL) based language recognizable by the answer server 300. As described above, the answer server 300 that provides the keywords for creating the question sentence and provides the answer result with respect to the question sentence based on the question language in the SPARQL based language will be described in detail below.

FIG. 4 is an example diagram of describing a display apparatus that creates a question sentence according to an exemplary embodiment of the present disclosure.

As shown in FIG. 4, the storage unit 160 may match and store a plurality of sentences and keywords corresponding to characteristic vectors for the plurality of respective sentences. Meanwhile, words extracted from user's speech voice may include "AAA", "movie", and "cast". If such words are extracted, the processor 140 may measure similarity between the keywords corresponding to the characteristic vectors of the plurality of sentences previously stored in the storage unit 160 and the words extracted from the user's speech voice.

In more detail, the processor 140 may generate a phonetic symbol of each of "AAA", "movie", and "cast" that are the words extracted from the user's speech voice. Thereafter, the processor 140 may measure similarity between phonetic symbols of the keywords corresponding to the characteristic vectors of the plurality of respective sentences previously stored in the storage unit 160 and phonetic symbols of respective "AAA", "movie", and "cast" using a similarity algorithm such as a confusion matrix. Thereafter, the processor 140 may extract a sentence including a keyword measured to have a similarity equal to or greater than a predetermined threshold value related to "AAA", "movie", and "cast" from among the plurality of previously stored sentences based on a similarity measurement result.

As shown in FIG. 4, the storage unit 160 may store first through sixth sentences 410, 420, 430, 440, 450, and 460 having high similarity related to at least one of "AAA", "movie", and "cast". As described above, if the first through sixth sentences 410 through 460 related to at least one of "AAA", "movie", and "cast" are stored, the processor 140 may extract a sentence having high similarity with respect to each of "AAA", "movie", and "cast" from the first through sixth sentences 410 through 460. As shown in FIG. 4, a first keyword with respect to "AAB" among keywords matching the sixth sentence 460 may have low similarity with "AAA". In this case, the processor 140 may determine the first through fifth sentences 410 through 450 except for the sixth sentence 460 as sentences having high similarity with "AAA", "movie", and "cast" and determine the first through fifth sentences 410 through 450 as question sentences predictable as a user's speech intention.

Figure 5:
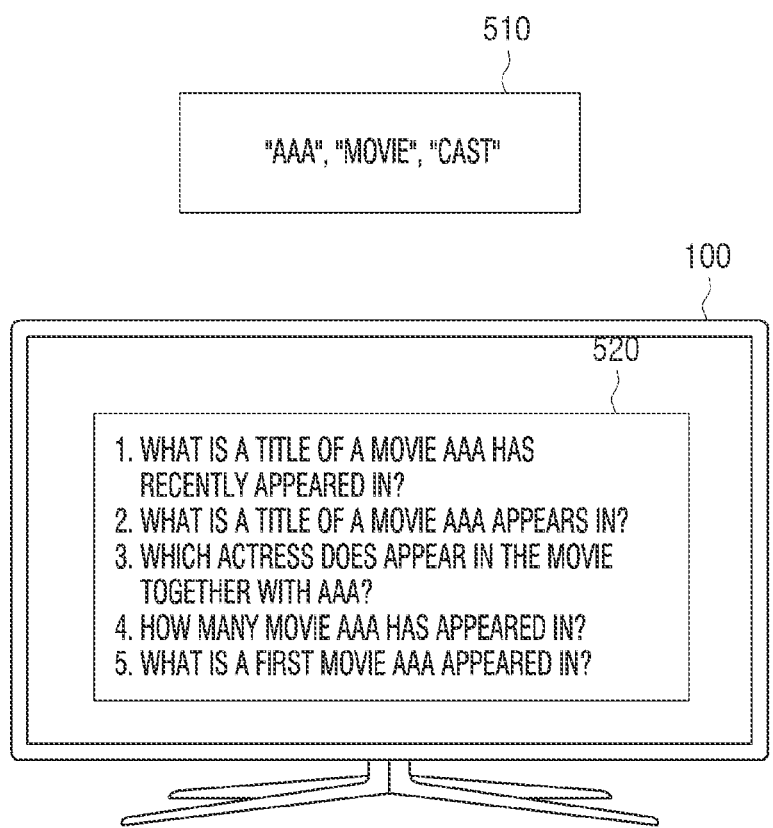
FIG. 5 is an example diagram of describing a display apparatus that displays a question sentence according to an exemplary embodiment of the present disclosure.

FIG. 5 is an example diagram of describing a display apparatus that displays a question sentence according to an exemplary embodiment of the present disclosure.

As described with reference to FIG. 4 above, the first through fifth sentences 410 through 450 may be determined as question sentences predictable as a user's speech intention in connection with a word 510 for each of "AAA", "movie", and "cast". As described above, if the plurality of question sentences are determined in connection with the word 510 for each of "AAA", "movie", and "cast", the processor 140 may control the display unit 120 to display the first through fifth sentences 410 through 450 selected as the question sentences in order of highest number of times selected as the question sentence based on selection history information of each of the first through fifth sentences 410 through 450. For example, in connection with the first through fifth sentences 410 through 450 selected as the question sentences, the first through fifth sentences 410 through 450 may be most selected by a user as the question sentences in order of the fourth sentence 440, the first sentence 410, the third sentence 430, the second sentence 420, and the fifth sentence 450.

In this case, the display unit 120 may display a question sentence list 520 in which the fourth sentence 440, the first sentence 410, the third sentence 430, the second sentence 420, and the fifth sentence 450 are sequentially listed on a screen.

Meanwhile, the processor 140 may control the display unit 120 to display only a predetermined number among the first through fifth sentences 410 through 450 selected as the question sentence. For example, if 3 is set as the number of question sentences that are to be included in the question sentence list 520, the processor 140 may determine the top three sentences, as the question sentences, in order of highest number of times previously selected as the question sentences among the first through fifth sentences 410 through 450. Thus, the display unit 120 may display the question sentence list 520 including the fourth sentence 440, the first sentence 410, and the third sentence 430 that have highest number of times previously selected as the question sentences among the first through fifth sentences 410 through 450 on the screen.

Therefore, the user may select a question sentence intended by the user from among question sentences listed on the question sentence list 520 displayed on the screen.

Figure 6:
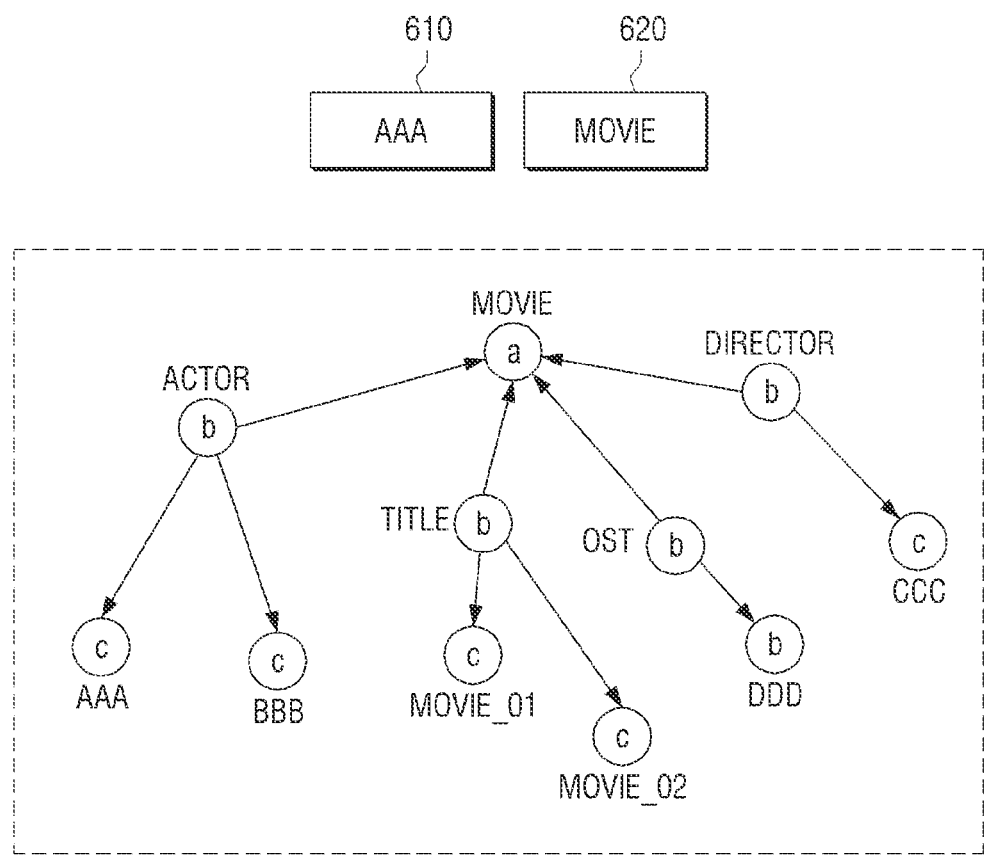
FIG. 6 is an example diagram of describing a display apparatus that receives keywords related to question sentences through an answer server according to an exemplary embodiment of the present disclosure.
Figure 7:
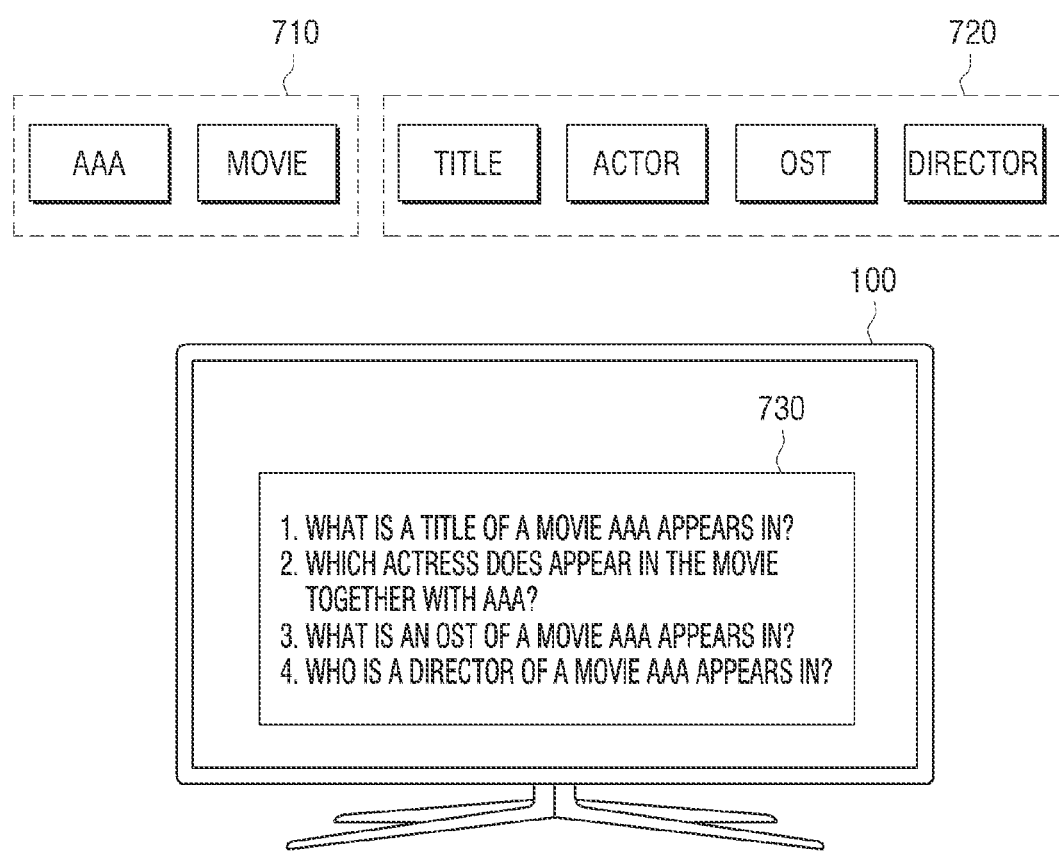
FIG. 7 is an example diagram of describing a display apparatus that displays question sentences based on keywords provided by an answer server according to an exemplary embodiment of the present disclosure.

FIG. 6 is an example diagram of describing the display apparatus 100 that receives keywords related to question sentences through the answer server 300 according to an exemplary embodiment of the present disclosure. FIG. 7 is an example diagram of describing the display apparatus 100 that displays question sentences based on keywords provided by the answer server 300 according to an exemplary embodiment of the present disclosure.

As shown in FIG. 6, user's speech voice may include a vocabulary column including a first word 610 "AAA" and a second word 620 "movie". In this case, the processor 140 may transmit text of the first and second words 610 and 620 to the answer server 300 that is a triple structure knowledge base server through the communication unit 130. If the text of the first and second words 610 and 620 is received, the answer server 300 may extract keywords associated with the first and second words 610 and 620 using attribute information of the first and second words 610 and 620.

In this regard, the answer server 300 is the triple structure knowledge base server and may extract keywords associated with each word using attribute information related to each word. In more detail, the answer server 300 may obtain higher attribute information for a "movie" from the first and second words 610 and 620. If the higher attribute information for a "movie" is obtained from the first and second words 610 and 620, the answer server 300 may obtain lower attribute information b of each of "actor", "director", and "OST" associated with the higher attribute information a. Thus, the answer server 300 may determine the higher attribute information for a "movie" associated with the first and second words 610 and 620 and the lower attribute information b of each of "actor", "director", and "OST" as keywords associated with the first and second words 610 and 620 and transmit a keyword search result to the display apparatus 100.

If such a keyword search result is received, the processor 140 may create question sentences by combining the vocabulary column 710 including the first and second words 610 and 620 and keywords 720 (actor, title, director, and OST) included in the keyword search result received from the answer server 300 based on a predefined standard sentence table.

As shown in FIG. 7, the display unit 120 may display a question sentence list 730 including the plurality of question sentences created based on the vocabulary column 710 including the first and second words 610 and 620 and the keywords 720 (actor, title, director, and OST) included in the keyword search result received from the answer server 300 on a screen. That is, the display unit 120 may display the question sentence list 730 including a first question sentence "What is a title of a movie AAA appears in?", a second question sentence "Which actress does appear in the movie together with AAA?", a third question sentence "What is an OST of the movie AAA appears in?", and a fourth question sentence "Who is a director of the movie AAA appears in?" on the screen. Thus, a user may select a question sentence intended by the user from among question sentences listed on the question sentence list 730 displayed on the screen.

If one question sentence is selected through various exemplary embodiments or if, as described above a user's speech, is a sentence speech, the processor 140 may analyze the selected question sentence or a user's speech sentence that is converted into text (hereinafter referred to as the question sentence) and create a question language. In more detail, the processor 140 may determine a sentence structure of the question sentence selected or spoken by the user using natural language processing based algorithm and extract an object name present in the question sentence. Thereafter, the processor 140 may determine a relationship with knowledge desired by the user based on the extracted object name.

According to an exemplary embodiment, the processor 140 may determine the relationship with the knowledge desired by the user through a lexical answer type (LAT) or focus method. In this regard, the LAT method is a method of performing a question intention analysis by classifying question sentences into forms thereof, and the focus method is a method of finding attributes of answers present in question sentences. Such the LAT and focus methods are well known, and thus detailed descriptions thereof are omitted in the present disclosure.

If keywords corresponding to characteristic vectors are extracted from the question sentence selected or spoken by the user through such various methods, the processor 140 may change the keywords extracted from the question sentence as a SPARQL language recognizable by the answer server 300 and transmit a question language converted into the SPARQL language to the answer server 300. Accordingly, the answer server 300 may generate or extract an answer result with respect to the user question sentence based on the question language received from the display apparatus 100 and transmit the answer result to the display apparatus 100.

For example, the question sentence selected or spoken by the user may be "What is a title of a movie AAA appears in?", and keywords corresponding to characteristic vectors extracted from the question sentence may be "AAA", "movie", and "title". In this case, as shown in FIG. 7, the answer server 300 may extract a first object c "movie_01" and a second object c "movie_02" based on "AAA", "movie", and "title" and transmit an answer result to the display apparatus 100. Thus, the display unit 120 may display answer results with respect to the first object c "movie_01" and the second object c "movie_02" related to the question sentence "What is a title of a movie AAA appears in?" based on the answer result received from the answer server 300 on the screen.

A method in which the display apparatus 100 provides a question and answer service based on user's speech voice will be described in detail below.

Figure 8:
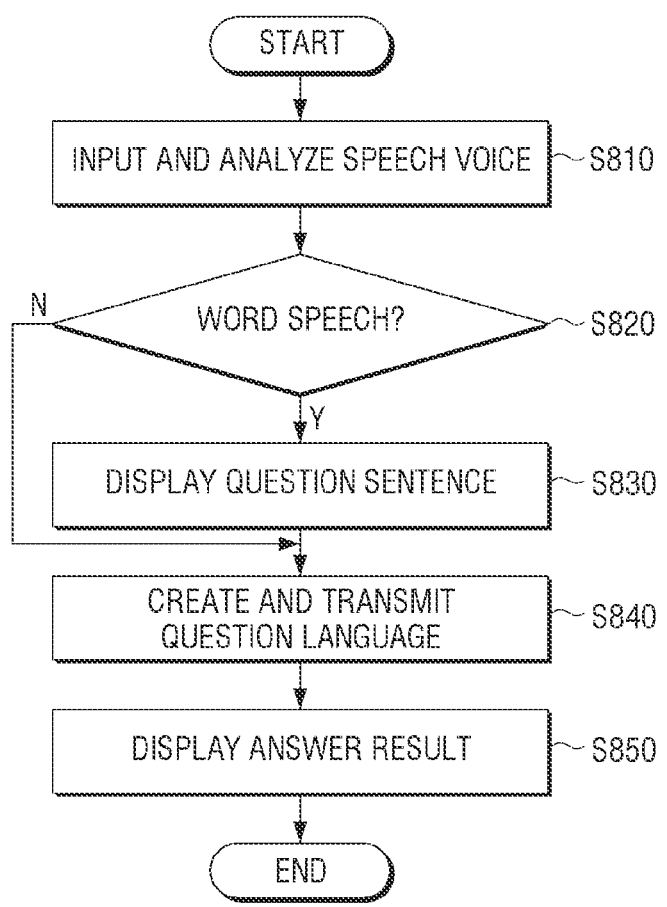
FIG. 8 is a flowchart of a method of a display apparatus that provides a question and answer service according to an exemplary embodiment of the present disclosure.

FIG. 8 is a flowchart of a method of the display apparatus 100 that provides a question and answer service according to an exemplary embodiment of the present disclosure.

As shown in FIG. 8, if user's speech voice is input in a voice recognition mode, the display apparatus 100 may determine whether text of the input speech voice includes one or more words (operations S810 and S820). According to an exemplary embodiment, if the user's speech voice is input through a microphone (not shown), the display apparatus 100 may convert the user's speech voice into text using a speech to text (STT) algorithm. Meanwhile, if a voice signal of the user's speech voice is input through a remote control apparatus (not shown), the display apparatus 100 may transmit the voice signal of the user's speech voice to the voice recognition apparatus 200. Accordingly, the voice recognition apparatus 200 may perform voice recognition on the voice signal of the speech voice, convert the speech voice into text, and transmit a voice recognition result to the display apparatus 100.

If the text is created with respect to the user's speech voice through the exemplary embodiment above, the display apparatus 100 may analyze the text created from the user's speech voice and determine whether a user speech is a sentence speech or a word speech. According to an exemplary embodiment, the display apparatus 100 may analyze a sentence structure of the text of the speech voice through a morpheme analysis and a syntax analysis that are natural language processing technologies and determine whether the user speech is the sentence speech or the word speech.

If the user speech is a speech including one or more words through text analysis on the speech voice, the display apparatus 100 may display one or more question sentences related to one or more words (operation S830).

According to an exemplary embodiment, the display apparatus 100 may determine one or more sentences including keywords related to one or more words among a plurality of previously stored sentences as the question sentences related to the user's speech voice. In more detail, the display apparatus 100 may compare similarity in a pronunciation column between keywords corresponding to characteristic vectors of the plurality of previously stored sentences and the one or more words. Thereafter, the display apparatus 100 may determine and display a sentence including a keyword having a high similarity with the one or more words as the question sentence related to the speech voice.

Meanwhile, if a plurality of sentences are determined as the question sentences, the display apparatus 100 may display the plurality of sentences selected as the question sentences in order of high number of times previously selected as the question sentences based on selection history information of each of the plurality of sentences.

Meanwhile, if a plurality of sentences determined as the question sentences exceed a predetermined number, the display apparatus 100 may select and display sentences, as the question sentences, corresponding to the predetermined number from a sentence having high number of times previously selected as the question sentences from among the plurality of sentences selected as the question sentences.

According to an exemplary embodiment, the display apparatus 100 may transmit the one or more words to the answer server 300, if receiving keywords related to the one or more words from the answer server 300, combine the received keywords, and create the question sentence with respect to the user's speech voice. In this regard, the answer server 300 is a triple structure knowledge base server and may perform an operation of extracting keywords associated with a word spoken by the user using attribute information related to the word and transmitting the extracted keywords to the display apparatus 100.

According to an exemplary embodiment, when there is no sentence including the keywords related to the one or more words among the plurality of previously stored sentences, the display apparatus 100 may transmit the one or more words to the answer server 300. Thus, the answer server 300 may perform an operation of extracting keywords associated with the one or more words received from the display apparatus 100 using attribute information of the one or more words and transmitting the keywords to the display apparatus 100. Through such various exemplary embodiments, the display apparatus 100 may display the one or more question sentences related to the user's speech voice.

Accordingly, a user may select a question sentence intended by the user from among the question sentences displayed on the display apparatus 100. As described above, if one question sentence is selected by the user or if it is determined in operation S820 that the user's speech is the sentence speech, the display apparatus 100 may analyze the selected question sentence or a user's speech sentence that is converted into text (hereinafter referred to as the question sentence), create a question language, and transmit the question language to the answer server 300 (operation S840). Accordingly, the answer server 300 may obtain one or more answer results related to information desired by the user based on the received question language and transmit the one or more answer results to the display apparatus 100.

Accordingly, the display apparatus 100 may display the one or more answer results received from the answer server 30 (operation S850).

In more detail, the display apparatus 100 may determine a sentence structure of the question sentence selected or spoken by the user using natural language processing based algorithm and extract an object name present in the question sentence. Thereafter, the display apparatus 100 may determine a relationship with knowledge desired by the user based on the extracted object name. According to an exemplary embodiment, the display apparatus 100 may determine the relationship with the knowledge desired by the user through a lexical answer type (LAT) or focus method.

If keywords corresponding to characteristic vectors are extracted from the question sentence selected or spoken by the user through such various methods, the display apparatus 100 may convert the keywords extracted from the question sentence as a SPARQL language recognizable by the answer server 300 and transmit a question language converted into the SPARQL language to the answer server 300. In this regard, the SPARQL based language may be a language for questioning a document of a semantic web ontology language (RDF (Resource Description Framework), RDFs (Resource Description Framework Schema), or OWL (ONTOLOO Web Language)) provided in the W3C (World Wide Web Consortium) standard.

Meanwhile, if the question language converted into the SPARQL language is received, the answer server 300 may generate or extract an answer result with respect to the user question sentence based on the received question language and transmit the answer result to the display apparatus 100.

As described above, according to one or more exemplary embodiments of the present disclosure, a display apparatus may provide an answer result appropriate to a user's question intention although a non-sentence speech is input.

The method of the display apparatus 100 that provides the question and answer service as described above may be implemented as at least one program to perform the method of providing the question and answer service described above. The program may be stored in a non-transitory computer readable medium.

The non-transitory computer readable medium is a medium which does not store data temporarily such as a register, cache, and memory, but stores data semi-permanently and is readable by devices. More specifically, the aforementioned programs may be stored in the non-transitory computer readable media such as compact disks (CDs), digital video disks (DVDs), hard disks, Blu-ray disks, universal serial buses (USBs), memory cards, and read-only memory (ROM).

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An electronic apparatus, comprising:
   a display;
   a communicator;

an input receiver configured to receive a user input;
a voice receiver configured to receive a voice input; and
a processor configured to:
> based on a plurality of words being included in text information corresponding to a first voice input, receive a plurality of suggested combination texts corresponding to a combination of words of the plurality of words through the communicator from a server,
> control the display to display the received plurality of suggested combination texts,
> based on a second voice input or the user input being received for selecting a suggested combination text of the plurality of suggested combination texts, receive information corresponding to the selected suggested combination text through the communicator from the server, and
> control the display to display the received information corresponding to the selected suggested combination text.

2. The electronic apparatus as claimed in claim 1, wherein the processor is further configured to control the display to display the plurality of suggested combination texts in order of a number of times in which each suggested combination text of the plurality of suggested combination texts has been previously selected based on selection history information.

3. The electronic apparatus as claimed in claim 1, wherein the processor is further configured to select and display a predetermined number of suggested combination texts from among the plurality of suggested combination texts based on a number of times in which each suggested combination text of the plurality of suggested combination texts has been previously selected based on selection history information.

4. The electronic apparatus as claimed in claim 1, further comprising:
> a storage configured to store a plurality of sentences, and keywords corresponding to characteristic vectors for the plurality of sentences, respectively,
> wherein the processor is configured to compare a similarity in a pronunciation column between the stored keywords corresponding to the characteristic vectors for the plurality of sentences, respectively, and the first voice input, and identify a sentence of the stored plurality of sentences including a keyword having a highest similarity with the first voice input as a suggested combination text of the plurality of suggested combination texts.

5. The electronic apparatus as claimed in claim 1, wherein the server is a triple structure knowledge base server and extracts the plurality of suggested combination texts using attribute information related to the plurality of words.

6. The electronic apparatus as claimed in claim 4, wherein the processor is further configured to, when there is no sentence including a suggested combination text having a predetermined similarity with the first voice input among the plurality of sentences, receive at least one suggested combination text corresponding to the first voice input from the server.

7. The electronic apparatus as claimed in claim 1, wherein the processor is further configured to, based on the text information being a sentence, extract an object name from the text information using a natural language processing based algorithm and generate a question language based on the extracted object name.

8. The electronic apparatus as claimed in claim 1, wherein the processor is further configured to control the display to display a user interface for selecting at least one suggested combination text of the plurality of suggested combination texts.

9. The electronic apparatus as claimed in claim 1, wherein the processor is further configured to:
> control the communicator to receive a third voice input from an external electronic apparatus, and
> based on a plurality of words being included in text information corresponding to the third voice input, receive a plurality of suggested combination texts corresponding to a combination of words of the plurality of words included in text information corresponding to the third voice input through the communicator from the server.

10. A controlling method of an electronic apparatus, the controlling method comprising:
> based on a plurality of words being included in text information corresponding to a first voice input, receiving a plurality of suggested combination texts corresponding to a combination of words of the plurality of words from a server;
> displaying the received plurality of suggested combination texts;
> based on a second voice input or a user input being received for selecting a suggested combination text of the plurality of suggested combination texts, receiving information corresponding to the selected suggested combination text through a communicator from the server; and
> displaying the received information corresponding to the selected suggested combination text.

11. The controlling method as claimed in claim 10, wherein the displaying the plurality of suggested combination texts comprises displaying the plurality of suggested combination texts in order of a number of times in which each suggested combination text of the plurality of suggested combination texts has been previously selected based on selection history information.

12. The controlling method as claimed in claim 10, wherein the displaying the plurality of suggested combination texts comprises displaying a predetermined number of suggested combination texts from among the plurality of suggested combination texts based on a number of times in which each suggested combination text of the plurality of suggested combination texts has been previously selected based on selection history information.

13. The controlling method as claimed in claim 10, further comprising:
> comparing a similarity in a pronunciation column between pre-stored keywords corresponding to characteristic vectors for each pre-stored sentence of a plurality of pre-stored sentences and the first voice input, and
> identifying a pre-stored sentence of the plurality of pre-stored sentences including a keyword having a highest similarity with the first voice input as a suggested combination text of the plurality of suggested combination texts.

14. The controlling method as claimed in claim 13, further comprising:
> when there is no sentence including a suggested combination text having a predetermined similarity with the first voice input among the plurality of pre-stored sentences, receiving at least one suggested combination text corresponding to the first voice input from the server.

15. The controlling method as claimed in claim 10, further comprising:
  based on the text information being a sentence, extracting an object name from the text information using a natural language processing based algorithm; and
  generating a question language based on the extracted object name.

16. The controlling method as claimed in claim 10, further comprising:
  displaying a user interface for selecting at least one suggested combination text of the plurality of suggested combination texts.

17. The controlling method as claimed in claim 10, further comprising:
  receiving a third voice input from an external electronic apparatus, and based on a plurality of words being included in text information corresponding to the third voice input, receiving a plurality of suggested combination texts corresponding to a combination of words of the plurality of words included in text information corresponding to the third voice input through the communicator from the server.

18. A non-transitory computer-readable storage medium coupled to an electronic apparatus and storing a computer program for executing operations of:
  based on a plurality of words being included in text information corresponding to a first voice input, receiving a plurality of suggested combination texts corresponding to a combination of words of the plurality of words from a server;
  displaying the received plurality of suggested combination texts;
  based on a second voice input or a user input being received for selecting a suggested combination text of the plurality of suggested combination texts, receiving information corresponding to the selected suggested combination text through a communicator from the server; and
  displaying the received information corresponding to the selected suggested combination text.

19. The non-transitory computer-readable storage medium as claimed in claim 18, wherein the operations further include displaying a user interface for selecting at least one suggested combination text of the plurality of suggested combination texts.

20. The non-transitory computer-readable storage medium as claimed in claim 18, wherein the operations further include:
  receiving a third voice input from an external electronic apparatus, and
  based on a plurality of words being included in text information corresponding to the third voice input, receiving a plurality of suggested combination texts corresponding to a combination of words of the plurality of words included in text information corresponding to the third voice input through the communicator from the server.

\* \* \* \* \*